(12) United States Patent
Betts et al.

(10) Patent No.: US 7,779,057 B2
(45) Date of Patent: Aug. 17, 2010

(54) METHOD AND APPARATUS FOR RETRIEVING AND SORTING ENTRIES FROM A DIRECTORY

(75) Inventors: Christopher Betts, Mount Dandenong (AU); Tony Rogers, Rowville (AU)

(73) Assignee: Computer Associates Think, Inc., Islandia, NY (US)

(*) Notice: Subject to any disclaimer, the term of this patent is extended or adjusted under 35 U.S.C. 154(b) by 945 days.

(21) Appl. No.: 10/888,737

(22) Filed: Jul. 9, 2004

(65) Prior Publication Data
US 2005/0108229 A1 May 19, 2005

Related U.S. Application Data

(60) Provisional application No. 60/486,784, filed on Jul. 11, 2003.

(51) Int. Cl.
G06F 12/00 (2006.01)
G06F 17/30 (2006.01)
(52) U.S. Cl. .................... 707/828; 707/830
(58) Field of Classification Search ............ 707/102, 707/4, 10; 358/1.15, 1.5
See application file for complete search history.

(56) References Cited

U.S. PATENT DOCUMENTS 6,233,577 B1 * 5/2001 Ramasubramani et al. ........ 1/1
6,775,023 B1 * 8/2004 Fukunaga et al. .......... 358/1.15
2004/0078368 A1 * 4/2004 Excoffier et al. .............. 707/4
2004/0243616 A1 * 12/2004 Benhase et al. ............ 707/102

FOREIGN PATENT DOCUMENTS

EP 1 026 867 A2 12/1999

OTHER PUBLICATIONS

Wahl M et al: "RFC 2251-Lightweight Directory Access Protocol (v3)- (LDAP)" Online Dec. 1997, XP002177976 Retrieved from the Internet: URL: http://www.ietf.org/rfc/rfc2253.txt?number=2251> the whole document.
ISO-IEC: "The Directory: Overview of Concepts, Models and Services X.500" Recommendation X.500 ISO/IEC 9594-1, XX, XX, 1993, p. I-III, 1, XP002273626 the whole document.
Johner H et al: "Understanding LDAP" IBM Redbooks, XX, XX, Nov. 10, 1999, XP002222591 p. 28, Line 34-p. 32, Line 2.
Molesworth R ED—Institution of Electrical Engineers: "An Overview of the CCITT X.500 Directory System" National Conference on Telecommunications. York, Apr. 2-5, 1989, ISBN: 0-85296-378-5 the whole document.
Wahl M et al. RFC 2253—Lightweight Directory Access Protocol (v3): UTF-8 String Representation of Distinguished Names Online Dec. 1997 XP002314330 Retrieved from the Internet: URL:http://www.ietf.org/rfc/rfc2253.txt?number=2253> Retrieved on January 20, 2005, abstract.

(Continued)

*Primary Examiner*—Charles Rones
*Assistant Examiner*—Fariborz Khoshnoodi
(74) *Attorney, Agent, or Firm*—Baker Botts L.L.P.

(57) ABSTRACT

Method and system for retrieving and sorting data entries in a directory is provided. A unique predetermined identifier is stored in a directory. The unique predetermined identifier is assigned as a relative distinguished name (RDN) for at least two entries, where the unique predetermined identifier is monotonically increased for each entry.

16 Claims, 6 Drawing Sheets

OTHER PUBLICATIONS

Smith et al., "Oracle Internet Directory Administrator's Guide," Release 9.2, Part No. A96574-01, http://download.oracle.com/docs/cd/B10501_01/network.920/a96574, Mar. 2002.

Chadwick et al., "The PERMIS X.509 Role Based Privilege Management Infrastructure," IS Institute, University of Salford, M5 4WT, England, pp. 1-18, Feb. 2003.

Armstrong, "An Introduction to XACML," GIAC Security Essentials, V. 1.4b (Aug. 2002), 11 pages, Jun. 29, 2003.

EPO Communication pursuant to 94(3) EPC, Application No. 04 777 782.6-1244, Ref. No. HCD/J00048489EP, 5 pages, Mar. 30, 2009.

Decision to Refuse a European Patent Application; Application No. 04 777 946.7—2201; Ref. HCD/J00048479EP, Jul. 14, 2009.

Summons to attend oral proceedings pursuant to Rule 115(1) EPC received from the EPO; Reference HCD/J00048479EP; Application No./Patent No. 04777946.7—2201/1649394, Feb. 27, 2009.

* cited by examiner

METHOD AND APPARATUS FOR RETRIEVING AND SORTING ENTRIES FROM A DIRECTORY

REFERENCE TO RELATED APPLICATIONS

The present disclosure is based on and claims the benefit of Provisional Application 60/486,784 filed Jul. 11, 2003, entitled "Simplified Retrieval And Sorting From A Directory", the entire contents of which are herein incorporated by reference.

BACKGROUND

1. Technical Field

The present disclosure relates generally to directory services and, more particularly, to a method and apparatus for retrieving and sorting entries from a directory.

2. Description of the Related Art

A directory is a structure that allows users to store and organize information on a computer system. Computer system(s) as referred to herein may include(s) individual computers, servers, computing resources, networks, etc. Directories are specialized databases optimized for reading, browsing, and searching for data and may contain descriptive, attribute based information.

The "Lightweight Directory Access Protocol" (LDAP) is a protocol for accessing directory services, such as X.500 based directory services. In LDAP, data objects, often referred to as data entries, are arranged in a hierarchical tree-like structure that may reflect geographic and/or organizational boundaries or may reflect Internet domain names. Each data entry (except the root entry) in the directory may have a parent entry and a local name, often referred to as a "Relative Distinguished Name" (RDN), or the name of the entry itself. The sum of a data entry's RDN, and all of its parents' RDNs comprise a "Distinguished Name" (DN). A DN is used to refer to each data entry unambiguously and identifies each data entry uniquely in the directory. Therefore, an entry may be referenced by its DN, which may be constructed by taking the RDN and concatenating the names of its ancestor entries.

For example, FIG. 1 is a block diagram illustrating an example directory tree using naming. It is practice to abbreviate the types of entries, so that in the example, 'c' stands for "country", 'st' stands for "state", 'o' stands for "organization", 'ou' stands for organizational unit, and 'cn' stands for "common name". In this example, there are two root entries, Australia 101 and the United States 102. The United States is the parent entry for the New York 103 entry. The New York 103 entry is the parent entry for the A 104 entry and the A 104 entry is the parent for organization units, Sales 105 and Research and Development (R&D) 106. Sales 105 is the parent for Alice 107 and Bob 108 and R&D is the parent for Charlie 109. For example, the entry Charlie 109 has an RDN of "Charlie" and a DN of the following: cn=Charlie, ou=R&D, o=A, st=New York, c=United States. The entry Bob 108 has an RDN of "Bob" and a DN of the following: cn=Bob, ou=Sales, o=A, st=New York, and c=United States. The entry A 104 has an RDN of "A" and a DN of the following: o=A, st=New York, and c=United States.

Users may use LDAP to search a directory for information in the directory. The LDAP search operation may allow a portion of the directory to be searched for entries that may match some criteria specified by a search filter. Information may be requested from each entry that matches the filter. For example, a user may want to search the entries directly below the state New York 103 and country United States 102 for organizations with the string "A" 104 in their name, and that have an employee "Charlie" 109.

A user may want to search a directory for a list of DNs that match a particular search criterion and read the results back in the order that they may have been added to the directory. However, one way of executing this search may result in decreased performance for both a client and a server. While a list of DNs may be read back in a single operation, retrieving a list of DNs, with accompanying timestamps for temporal sorting may significantly slow down the search. For example, the server has to return entry attributes in addition to entry names and the client has to maintain the association between the entry name and the timestamp while the server is processing the request.

In addition, a user may want to search a directory for a list of DNs and sort the list to recreate the tree structure that the DNs had when they were first stored in the directory. For example, this may be done for display to users, but may also be required for efficient writing to other directories and data stores. The DNs may be searched and sorted by using string sorts; however, because the DNs are returned in an arbitrary order, a degree of string parsing may also be required. For example, a depth first tree sort may be performed where sibling entries may be sorted alphabetically by RDN. However, the string parsing involved in sorting operations may also result in decreased performance for both a client and a server.

Accordingly, it is desirable to have reliable and effective tools for retrieving and sorting entries from a directory in order to ensure optimum performance.

SUMMARY

A method for retrieving and sorting entries from a directory, comprises storing a unique predetermined identifier in a directory, and assigning as a relative distinguished name (RDN) the unique predetermined identifier for at least two entries in the directory, wherein the unique predetermined identifier is monotonically increased for each entry.

A system for retrieving and sorting entries from a directory, comprises a storing layer for storing a unique predetermined identifier in a directory, and an assigning layer for assigning as a relative distinguished name (RDN) the unique predetermined identifier for at least two entries in the directory, wherein the unique predetermined identifier is monotonically increased for each entry.

A computer storage medium including computer executable code for retrieving and sorting entries from a directory, comprises code for storing a unique predetermined identifier in a directory, and code for assigning as a relative distinguished name (RDN) the unique predetermined identifier for at least two entries in the directory, wherein the unique predetermined identifier is monotonically increased for each entry.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for retrieving and sorting entries from a directory. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 2:
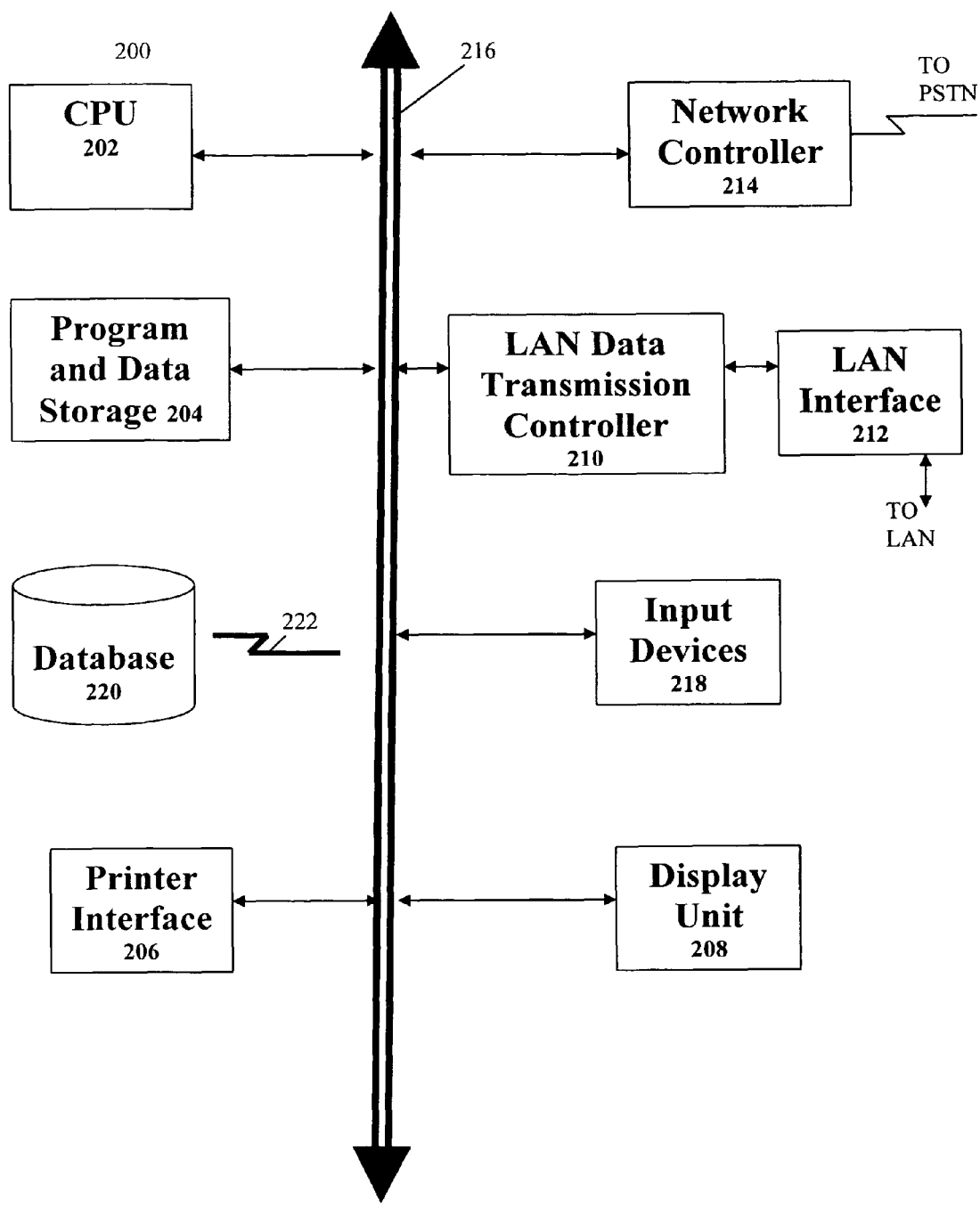
FIG. 2 shows a block diagram of an exemplary computer system capable of implementing the method and system of the present disclosure.

FIG. 2 shows an example of a computer system 200 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 200 can include a central processing unit (CPU) 202, program and data storage devices 204, a printer interface 206, a display unit 208, a (LAN) local area network data transmission controller 210, a LAN interface 212, a network controller 214, an internal bus 216, and one or more input devices 218 (for example, a keyboard, mouse etc.). As shown, the system 200 may be connected to a database 220, via a link 222.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Figure 3A:
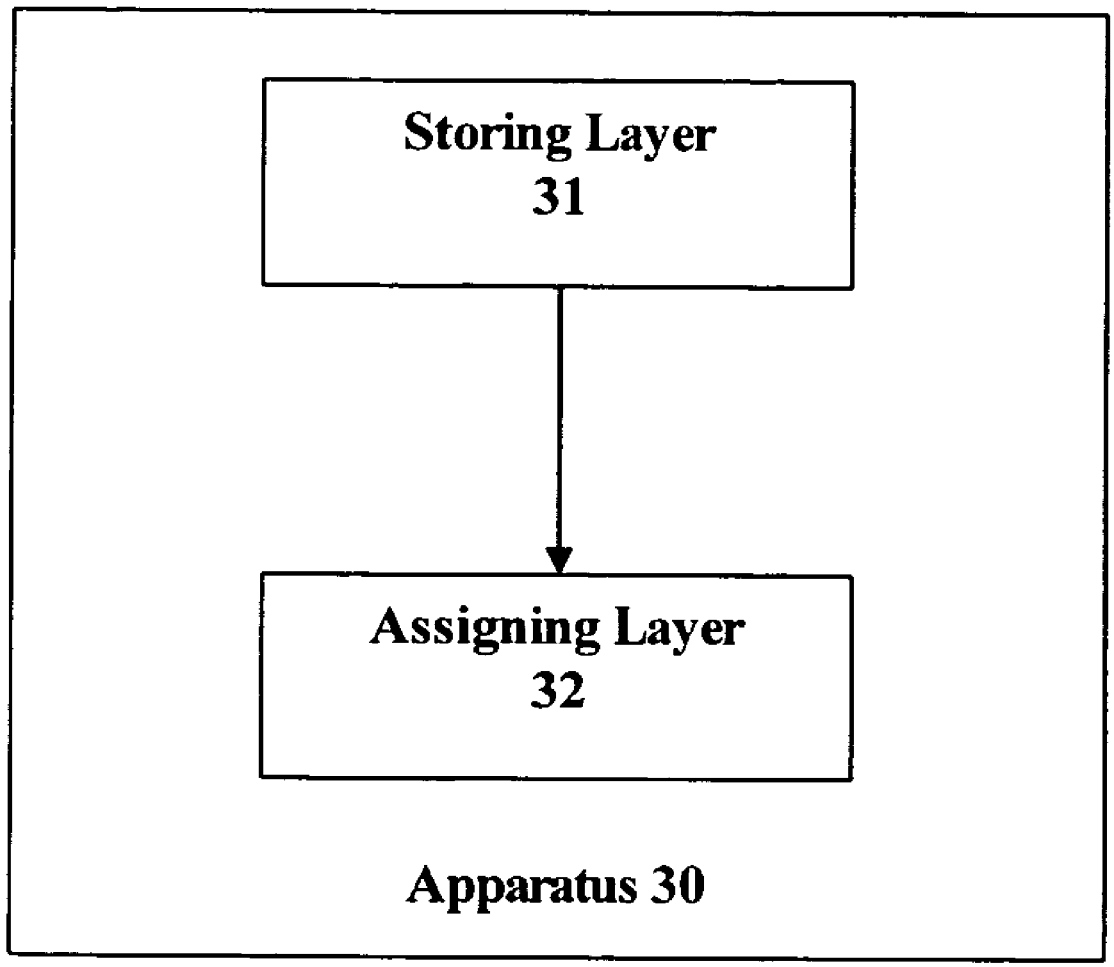
FIG. 3A shows a block diagram illustrating an apparatus for retrieving and sorting entries from a directory, according to an embodiment of the present disclosure.

An apparatus for retrieving and sorting entries from a directory, according to an embodiment of the present disclosure, will be discussed below with reference to FIG. 3A. The apparatus 30 includes a storing layer 31 and a assigning layer 32.

Figure 3B:
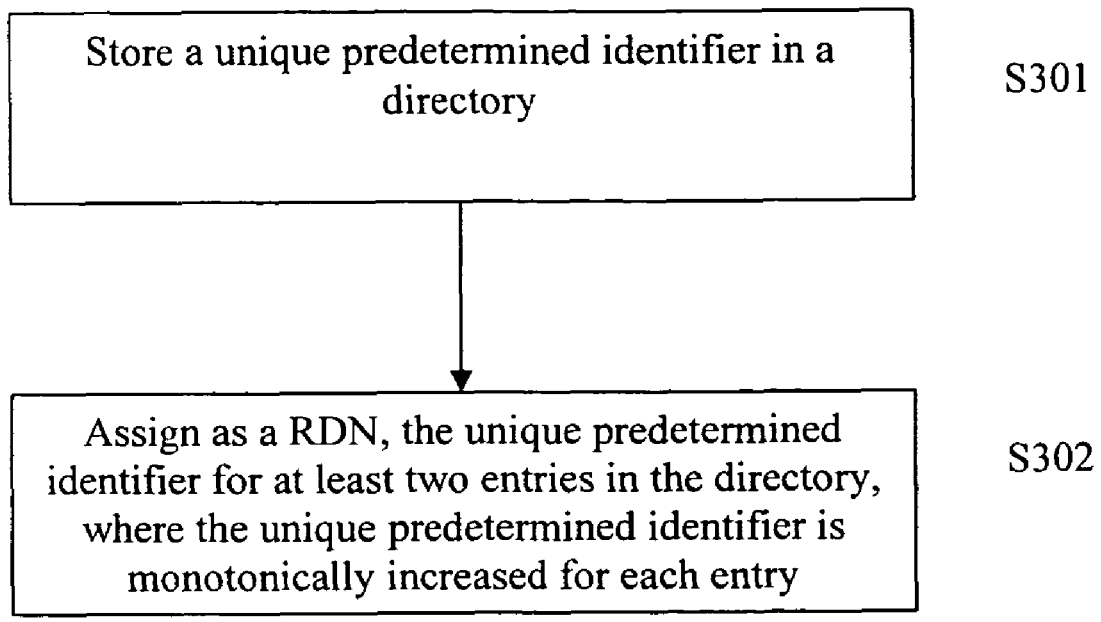
FIG. 3B shows a flow chart illustrating a method for retrieving and sorting entries from a directory, according to an embodiment of the present disclosure.

A method for retrieving and sorting entries from a directory, according to an embodiment of the present disclosure, will be explained below with reference to FIGS. 3A and 3B. The storing layer 31 may store a unique predetermined identifier in a directory (Step S301). The assigning layer 32 may assign a relative distinguished name (RDN) the unique predetermined identifier stored by the storing layer 31 for at least two entries in the directory (Step S302). The unique predetermined identifier is monotonically increased for each entry. The unique predetermined identifier may be a number that represents a timestamp or is issued in time order and may be provided from a source which has system wide application.

The method for retrieving and sorting entries from a directory may further comprise sorting the unique predetermined identifiers for at least two entries. The sorting may include searching entries stored in the directory, returning at least two entries, and sorting the returned entries according to their assigned RDN. According to an embodiment of the present disclosure, tree structure sorting and date sorting may be simultaneously performed.

According to an embodiment of the present disclosure, each data entry in a directory may be given an RDN containing as its value a sequential unique predetermined numeric identifier. When the hierarchal data is written to the database, monotonically increasing numeric identifiers may be assigned at every level. In other words, the numeric identifier is incremented before the data entry is stored in the directory, resulting in data entries stored in order. Therefore, by sorting these RDN values, a user can implicitly obtain the entries in date order and may also simultaneously perform efficient reconstruction of tree structured data. This enables an entire list of data entries to be sorted quickly and efficiently because less data is being read from the directory and only numeric identifiers are being sorted.

Figure 1:
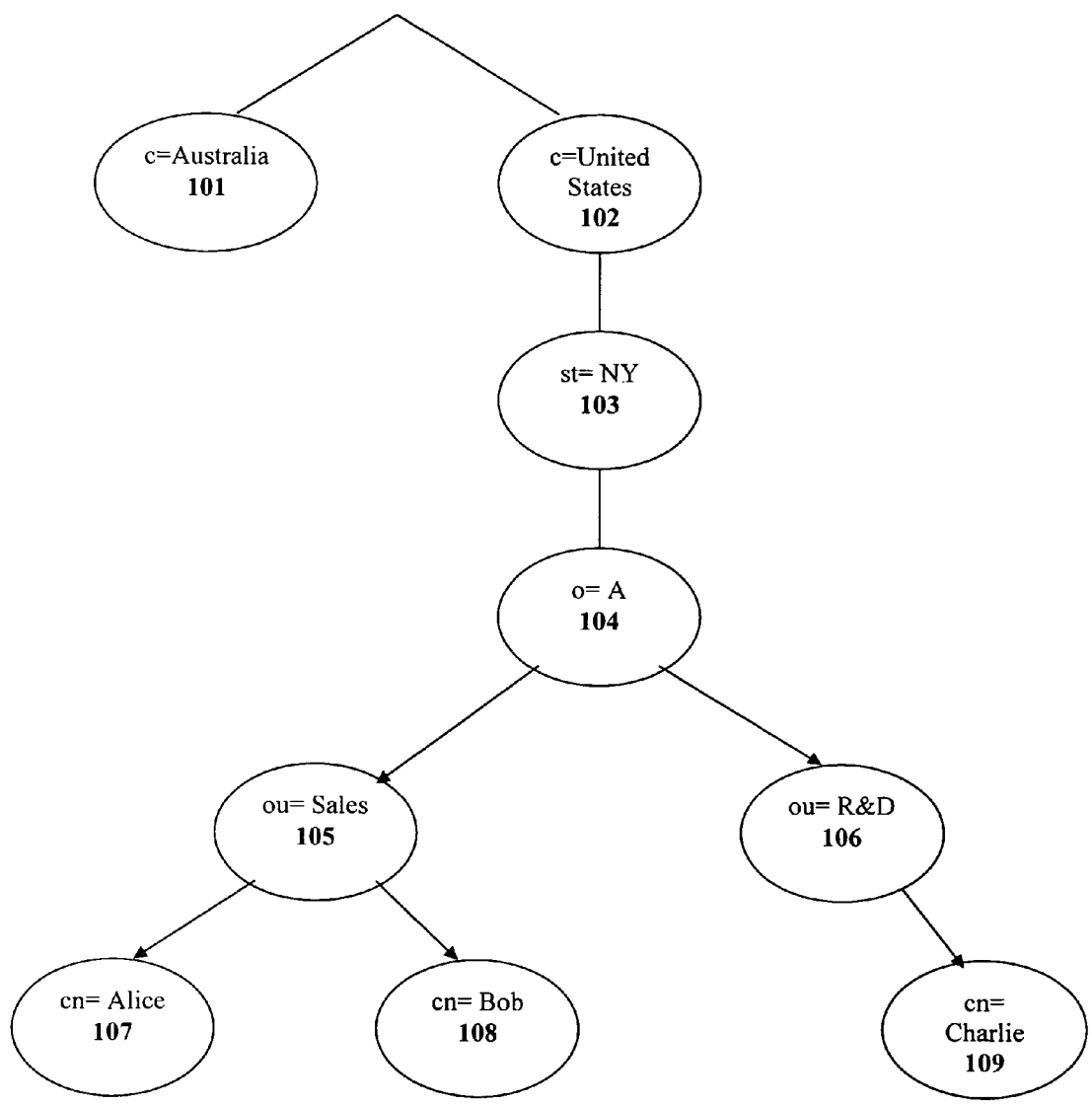
FIG. 1 shows a block diagram illustrating an example directory tree using naming.
Figure 4:
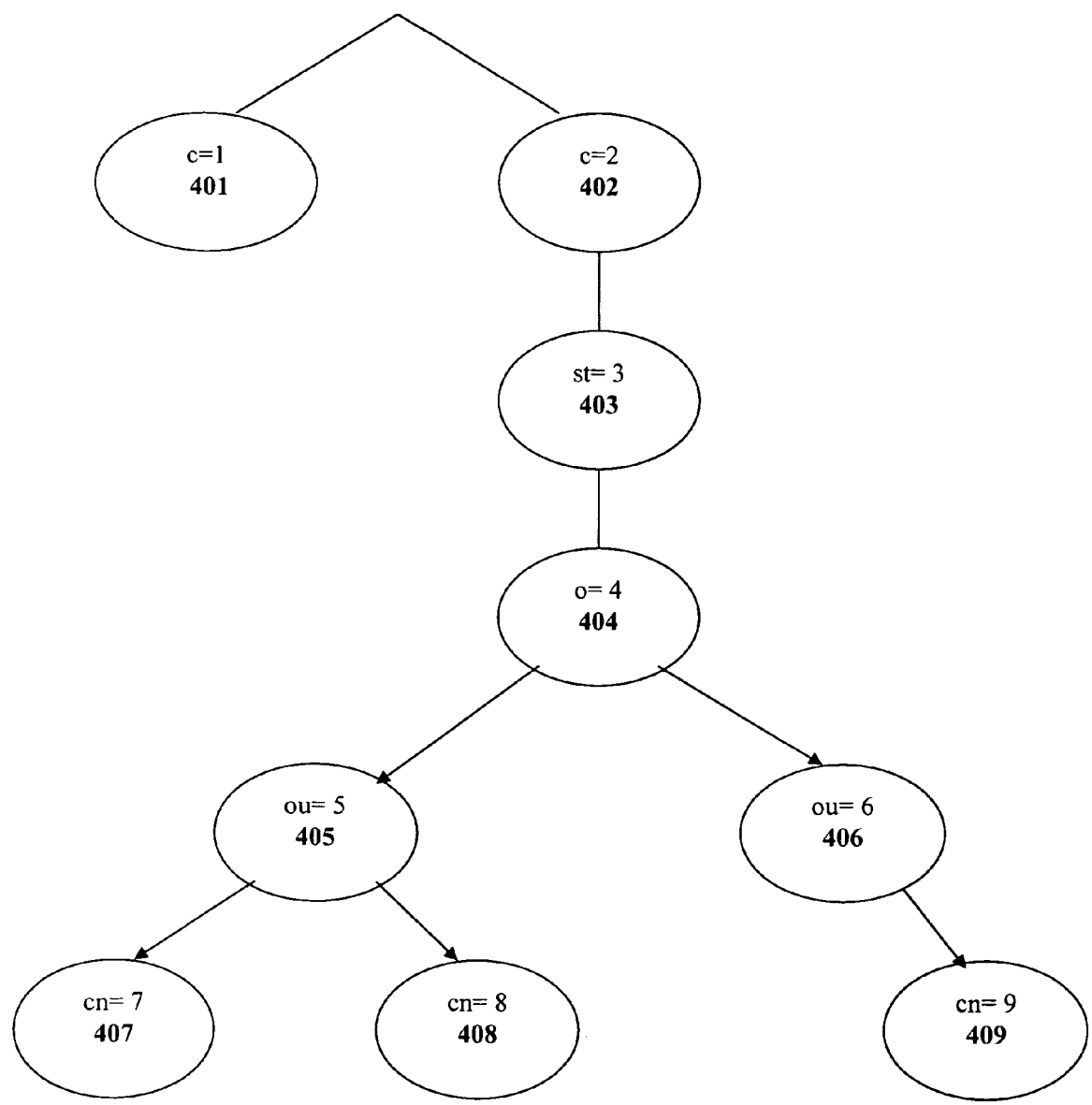
FIG. 4 shows a block diagram illustrating assigning as a relative distinguished name the predetermined numeric identifiers, according to an embodiment of the present disclosure.

For example, the data in the directory tree shown in FIG. 1 may be written to the directory by using numeric identifiers, as shown in FIG. 4. The two root entries, Australia 101 and the United States 102 become c=1 401 and c=2 402, respectively. For example, the entry Charlie 109 having a previous RDN of "Charlie" would have an RDN of cn=9 409.

DN ordering may be performed in a conventional way where the most specific RDNs (e.g., the Entry or rightmost RDNs) for a given DN may be sorted first, followed by each remaining RDN sorted in numerical order, according to an embodiment of the present disclosure. For example, for a pair of DNs, the most specific RDNs (e.g., Entry or rightmost RDNs) of both DNs may be analyzed. If the most specific RDNs are different, the values are compared and placed in numerical order. However, if the most specific RDNs are the same, then the Parent of the most specific RDN is analyzed and compared. It should be noted that a non-existent RDN may be considered to have a higher sorting order than an existent RDN, and therefore, may be placed before the existent RDN.

Figure 5:
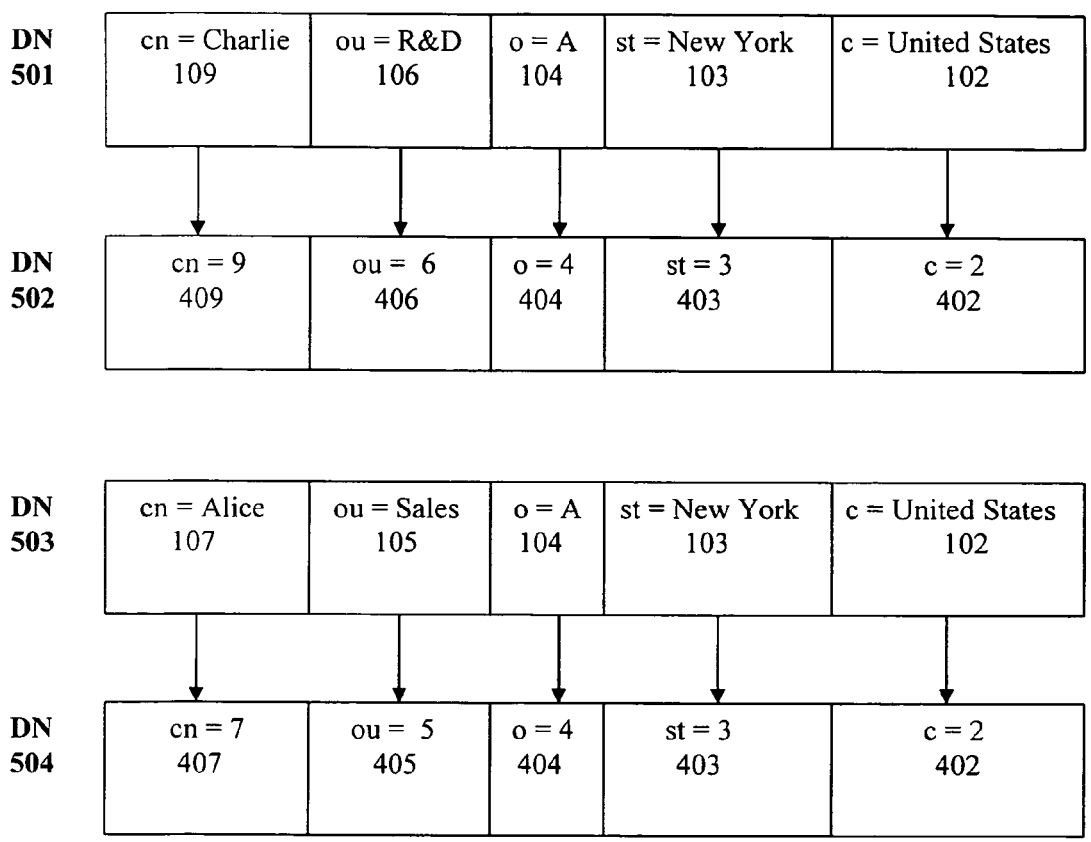
FIG. 5 shows is a block diagram illustrating the distinguished name (DN) ordering methodology, according to an embodiment of the present disclosure.

FIG. 5 is a block diagram illustrating the DN ordering methodology, according to an embodiment of the present disclosure. In this example, DNs 501 and 503 may be converted to DNs 502 and 504, respectively, by using embodiments of the present disclosure. The rightmost RDNs are 402 and are the same for both DNs 502 and 504. Therefore, the next rightmost pair of RDNs, 403 for both DNs 502 and 504 are compared. The RDNs 403 and 404 for both DNs 502 and 504 are also the same, and therefore, the next pair of RDNs is compared. RDN 406 for DN 502 is different from RDN 405 for DN 504, and because RDN 405 for DN 504 is greater than RDN 406 for DN 502, it sorts before RDN 406. Therefore, DN 504 can sort before DN 502.

By using embodiments of the present disclosure, regardless of how the data entries are retrieved by a search, once the DNs are sorted, data entries may easily be obtained in both tree structure order and date order. For example, after sorting the directory tree shown in FIG. 4 by using the method of the present disclosure, the results may be the following:
c=1
c=2
st=3, c=2
o=4, st=3, c=2
ou=5, o=4, st=3, c=2
ou=6, o=4, st=3, c=2
cn=7, ou=5, o=4, st=3, c=2
cn=8, ou=5, o=4, st=3, c=2
cn=9, ou=6, o=4, st=3, c=2

The data entries in this example are returned in the temporal order that they were written in, in other words, all of a parent entry's children are in temporal order.

Embodiments of the present disclosure may be used to reconstruct the results of searches that may return only a part of a tree. For example, suppose that the search results returned are the following:
cn=5, ou=3, ou=2, o=1
ou=7, ou=2, o=1,
ou=2, o=1
o=1
ou=3, ou=2, o=1

When sorted in date order, the above search results may be the following:
o=1
ou=2, o=1
ou=3, ou=2, o=1
cn=5, ou=3, ou=2, o=1
ou=7, ou=2, o=1

When simultaneously sorted in structural order, the above search results may be the following:

---
```
o = 1
   ou = 2
      ou = 3
         cn = 5
      ou = 7
```
---

The numeric identifier may be stored in the directory and incremented by the directory by using, for example, an atomic LDAP "replace value X with value Y" operation. This operation may ensure that different applications or application threads cannot simultaneously update the global numeric identifier, and will always get unique numeric identifiers (the replace "X" operation will fail if X has already been replaced).

According to an embodiment of the present disclosure, a range of numeric identifiers may be acquired when a large number of data entries are being written, thus ensuring local consistency and reducing the number of directory calls.

It should be noted that even if new data entries were added to the existing directory tree, the embodiments of the present disclosure for retrieving and sorting data entries from a database will still work. For example, suppose the following DN was added to the directory tree, ou=9, ou=3, ou=2, o=1. An initial search for all the entries may provide the following search results:
ou=7, ou=2, o=1
cn=5, ou=3, ou=2, o=1
sn=6, ou=3, ou=2, o=1
o=1
ou=3, ou=2, o=1
ou=9, ou=3, ou=2, o=1.
ou=2, o=1
cn=4, ou=3, ou=2, o=1
sn=8, ou=7, ou=2, o=1

When sorted in date order, the above search results may be the following:
o=1
ou=2, o=1
ou=3, ou=2, o=1
cn=4, ou=3, ou=2, o=1
cn=5, ou=3, ou=2, o=1
sn=6, ou=3, ou=2, o=1
sn=9, ou=3, ou=2, o=1
ou=7, ou=2, o=1
sn=8, ou=7, ou=2, o=1

The above search results provide the correct order for the structure, where the children of each parent entry are in the temporal order that they were written to the directory.

According to another embodiment of the present disclosure, the method for retrieving and sorting entries from a directory may be used for local sub-trees in a directory. Each sub-tree may have its own "sub-tree identifier" which can be sequentially incremented for each data entry in the directory. This may be useful when fast sorting may be required for sub-trees.

Numerous additional modifications and variations of the present disclosure are possible in view of the above-teachings. It is therefore to be understood that within the scope of the appended claims, the present disclosure may be practiced other than as specifically described herein.

What is claimed is:

1. A computer-implemented method for retrieving and sorting entries from a directory, comprising:
    storing a unique predetermined identifier in a directory;
    assigning as a relative distinguished name (RDN) the unique predetermined identifier for at least two entries in the directory, wherein the unique predetermined identifier is monotonically increased for each entry; and
    sorting the unique predetermined identifiers for at least two entries, by searching entries stored in the directory, returning at least two entries, and sorting the returned entries according to their assigned RDN.

2. The method of claim 1, wherein a tree structure sorting and date sorting are simultaneously performed.

3. The method of claim 1, wherein each unique predetermined identifier is a number.

4. The method of claim 1, wherein each unique predetermined identifier is provided from a source which has system wide application.

5. The method of claim 1, wherein each unique predetermined identifier represents a timestamp or is issued in time order.

6. An apparatus for retrieving and sorting entries from a directory, comprising:
    a processor;
    a storing layer for storing a unique predetermined identifier in a directory;
    an assigning layer for assigning as a relative distinguished name (RDN) the unique predetermined identifier for at least two entries in the directory, wherein the unique predetermined identifier is monotonically increased for each entry; and
    a sorting layer for sorting the unique predetermined identifiers for at least two entries, by searching entries stored in the directory, returning at least two entries, and sorting the returned entries according to their assigned RDN.

7. The apparatus of claim 6, wherein a tree structure sorting and date sorting are simultaneously performed.

8. The apparatus of claim 6, wherein each unique predetermined identifier is a number.

9. The apparatus of claim 6, wherein each unique predetermined identifier is provided from a source which has system wide application.

10. The apparatus of claim 6, wherein each unique predetermined identifier represents a timestamp or is issued in time order.

11. A system for retrieving and sorting entries from a directory including the apparatus of any one of claims 6 and 7 through 10.

12. A computer readable storage medium including computer executable code for retrieving and sorting entries from a directory, comprising:

code for storing a unique predetermined identifier in a directory;

code for assigning as a relative distinguished name (RDN) the unique predetermined identifier for at least two entries in the directory, wherein the unique predetermined identifier is monotonically increased for each entry; and code for sorting the unique predetermined identifiers for at least two entries, by searching entries stored in the directory, returning at least two entries, and sorting the returned entries according to their assigned RDN.

13. The computer readable storage medium of claim 12, wherein a tree structure sorting and date sorting are simultaneously performed.

14. The computer readable storage medium of claim 12, wherein each unique predetermined identifier is a number.

15. The computer readable storage medium of claim 12, wherein each unique predetermined identifier is provided from a source which has system wide application.

16. The computer readable storage medium of claim 12, wherein each unique predetermined identifier represents a timestamp or is issued in time order.

* * * * *